(12) United States Patent  
Bongaerts et al.

(10) Patent No.: US 9,371,498 B2  
(45) Date of Patent: Jun. 21, 2016

(54) LUBRICANT SYSTEM AND METHOD OF FORMING THE SAME

(75) Inventors: Jeroen Bongaerts, Hilversum (NL); Alexander de Vries, Tiel (NL); Piet Lugt, Vianen (NL); Dick Meijer, Wageningen (NL); Dries Muller, Nijmegen (NL); Rihard Pasaribu, Nieuwegein (NL); Alejandro Sanz, Nieuwegin (NL); Richard Schaake, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 421 days.

(21) Appl. No.: 13/880,576

(22) PCT Filed: Oct. 24, 2011

(86) PCT No.: PCT/EP2011/068574  
§ 371 (c)(1),  
(2), (4) Date: Jun. 18, 2013

(87) PCT Pub. No.: WO2012/055825  
PCT Pub. Date: May 3, 2012

(65) Prior Publication Data  
US 2013/0256064 A1    Oct. 3, 2013

Related U.S. Application Data

(60) Provisional application No. 61/406,416, filed on Oct. 25, 2010, provisional application No. 61/418,081, filed on Nov. 30, 2010, provisional application No. 61/421,985, filed on Dec. 10, 2010, provisional application No. 61/426,083, filed on Dec. 22, 2010.

(51) Int. Cl.  
*F16N 7/12*    (2006.01)  
*C10M 143/04*    (2006.01)  
(Continued)

(52) U.S. Cl.  
CPC .............. *C10M 143/04* (2013.01); *B01J 20/24* (2013.01); *B01J 20/26* (2013.01);  
(Continued)

(58) Field of Classification Search  
CPC ... F16C 33/6655; F16C 33/6611; F16C 33/56  
USPC .................................................. 184/6.11, 102  
See application file for complete search history.

(56) References Cited

U.S. PATENT DOCUMENTS 1,936,863 A * 11/1933 Skillman ...................... 384/297  
2,980,614 A    4/1961 Borg et al.  
(Continued)

FOREIGN PATENT DOCUMENTS

CH          646451 A     11/1984  
DE     2031130 A1     12/1971  
(Continued)

OTHER PUBLICATIONS

XP002665404; Hiroshi I; Ito H Perfluoropolyether Compound Composition Used as Lubricant for e.g. Mobile Telephone Hinge, Consists of Perfluoropolyether and Metal-Covering Organic Resin Short Fiber; vol. 2010, Nr:32; WPI / Thomson, Apr. 30, 2010; 2010-E86056; Thomson Scientific, London, GB.  
(Continued)

*Primary Examiner* — Michael Mansen  
*Assistant Examiner* — Mark K Buse  
(74) *Attorney, Agent, or Firm* — Bryan Peckjian; SKF USA Inc. Patent Department

(57) ABSTRACT

A lubricant system is disclosed that is formed by contacting a fibrous network with oil and/or lubricating fluid having an affinity for the fibrous network. The fibrous network comprises oleophilic fibers having a diameter between 50 nm and 10 microns and a length that is at least times the diameter. In addition, the oleophilic fibers have an affinity for the oil and/or lubricating fluid.

34 Claims, 3 Drawing Sheets

(51) Int. Cl.

| | |
|---|---|
| F16C 33/66 | (2006.01) |
| B01J 20/24 | (2006.01) |
| B01J 20/26 | (2006.01) |
| B01J 20/28 | (2006.01) |
| B01J 20/32 | (2006.01) |
| B82Y 30/00 | (2011.01) |
| C10M 171/06 | (2006.01) |
| F16C 33/56 | (2006.01) |

(52) U.S. Cl.

CPC ..... *B01J 20/28007* (2013.01); *B01J 20/28023* (2013.01); *B01J 20/3208* (2013.01); *B82Y 30/00* (2013.01); *C10M 171/06* (2013.01); *F16C 33/56* (2013.01); *F16C 33/6611* (2013.01); *F16C 33/6655* (2013.01); *F16N 7/12* (2013.01); *B01J 2220/445* (2013.01); *B01J 2220/46* (2013.01); *C10M 2201/02* (2013.01); *C10M 2203/10* (2013.01); *C10M 2203/102* (2013.01); *C10M 2203/1025* (2013.01); *C10M 2205/02* (2013.01); *C10M 2205/022* (2013.01); *C10M 2205/024* (2013.01); *C10M 2205/028* (2013.01); *C10M 2205/04* (2013.01); *C10M 2205/14* (2013.01); *C10M 2205/16* (2013.01); *C10M 2205/18* (2013.01); *C10M 2207/022* (2013.01); *C10M 2207/28* (2013.01); *C10M 2207/40* (2013.01); *C10M 2209/04* (2013.01); *C10M 2209/062* (2013.01); *C10M 2209/08* (2013.01); *C10M 2209/084* (2013.01); *C10M 2209/10* (2013.01); *C10M 2209/102* (2013.01); *C10M 2209/103* (2013.01); *C10M 2209/104* (2013.01); *C10M 2209/12* (2013.01); *C10M 2213/02* (2013.01); *C10M 2213/062* (2013.01); *C10M 2217/022* (2013.01); *C10M 2217/024* (2013.01); *C10M 2217/026* (2013.01); *C10M 2217/028* (2013.01); *C10M 2217/04* (2013.01); *C10M 2217/044* (2013.01); *C10M 2217/045* (2013.01); *C10M 2217/046* (2013.01); *C10M 2221/02* (2013.01); *C10M 2221/04* (2013.01); *C10M 2229/02* (2013.01); *C10M 2229/04* (2013.01); *C10N 2220/022* (2013.01); *C10N 2220/082* (2013.01); *C10N 2220/086* (2013.01); *C10N 2220/10* (2013.01); *C10N 2220/14* (2013.01); *C10N 2240/02* (2013.01); *C10N 2250/08* (2013.01); *C10N 2250/10* (2013.01); *C10N 2250/14* (2013.01); *C10N 2270/00* (2013.01); *Y10T 428/298* (2015.01)

(56) References Cited

U.S. PATENT DOCUMENTS

| | | | | |
|---|---|---|---|---|
| 3,417,018 | A | | 12/1968 | Burns |
| 3,520,807 | A | * | 7/1970 | Cross et al. .................. 508/140 |
| 3,525,689 | A | | 8/1970 | Marotta |
| 3,674,689 | A | | 7/1972 | Giltrow et al. |
| 3,888,766 | A | * | 6/1975 | De Young .................... 210/680 |
| 4,346,028 | A | | 8/1982 | Griffith |
| 4,545,913 | A | | 10/1985 | Mahrus et al. |
| 4,735,733 | A | | 4/1988 | Blumenthal et al. |
| 5,156,905 | A | * | 10/1992 | Bagrodia et al. ............. 442/401 |
| 5,361,450 | A | | 11/1994 | Shofner et al. |
| 5,415,791 | A | * | 5/1995 | Chou et al. .................... 508/103 |
| 5,431,500 | A | * | 7/1995 | Harris et al. .................. 384/206 |
| 5,874,391 | A | * | 2/1999 | Meijer et al. .................. 508/591 |
| 5,887,994 | A | * | 3/1999 | Nomura et al. ............... 400/352 |
| 5,935,883 | A | | 8/1999 | Pike |
| 6,077,468 | A | * | 6/2000 | Jariwala et al. ............... 264/103 |
| 6,153,301 | A | | 11/2000 | Iwata et al. |
| 6,255,380 | B1 | | 7/2001 | Oki et al. |
| 6,482,780 | B2 | * | 11/2002 | Yokouchi et al. ............. 508/523 |
| 6,843,549 | B2 | * | 1/2005 | Cajigas et al. ................... 347/22 |
| 7,135,441 | B2 | * | 11/2006 | Sugimori et al. ............. 508/485 |
| 7,150,775 | B2 | | 12/2006 | Tavares et al. |
| 7,226,899 | B2 | * | 6/2007 | Cole et al. .................... 510/296 |
| 7,275,319 | B2 | * | 10/2007 | Lugt et al. .................... 29/898.1 |
| 7,993,087 | B2 | * | 8/2011 | Hsieh ............................ 411/424 |
| 2002/0185336 | A1 | * | 12/2002 | West et al. ........................ 184/5 |
| 2003/0022797 | A1 | * | 1/2003 | Oohira et al. ................. 508/107 |
| 2004/0042965 | A1 | | 3/2004 | Usui et al. |
| 2004/0144207 | A1 | | 7/2004 | Tavares et al. |
| 2005/0096234 | A1 | * | 5/2005 | Mack et al. ................... 508/100 |
| 2005/0197260 | A1 | | 9/2005 | Johnson et al. |
| 2006/0049386 | A1 | * | 3/2006 | Kody et al. ................... 252/500 |
| 2007/0175193 | A1 | | 8/2007 | Niakan |
| 2008/0107789 | A1 | | 5/2008 | Akimoto |
| 2009/0220763 | A1 | * | 9/2009 | Hatfield et al. ............. 428/315.5 |
| 2009/0220764 | A1 | * | 9/2009 | Hatfield et al. ............. 428/315.9 |
| 2010/0051471 | A1 | | 3/2010 | Meng et al. |
| 2010/0247269 | A1 | * | 9/2010 | Hsieh ............................ 411/424 |
| 2011/0041693 | A1 | * | 2/2011 | Hatfield et al. ..................... 96/9 |
| 2013/0256064 | A1 | | 10/2013 | Bongaerts et al. |
| 2013/0256065 | A1 | | 10/2013 | Bongaerts et al. |
| 2013/0274159 | A1 | | 10/2013 | Bongaerts et al. |
| 2013/0296206 | A1 | | 11/2013 | Bongaerts et al. |
| 2013/0302609 | A1 | | 11/2013 | Bongaerts et al. |

FOREIGN PATENT DOCUMENTS

| | | |
|---|---|---|
| EP | 1894609 A | 3/2008 |
| GB | 1107650 A | 3/1968 |
| GB | 2070622 A | 9/1981 |
| JP | H05-163485 A | 6/1993 |
| JP | 2010-100703 A | 5/2010 |
| JP | 2010100703 A | 5/2010 |
| WO | 97/18897 A2 | 5/1997 |
| WO | 02/10320 A | 2/2002 |
| WO | 2005/070596 A1 | 8/2005 |
| WO | 2008/113021 A2 | 9/2008 |

OTHER PUBLICATIONS

Database WPI, Week 201032, Thomson Scientific, London, GB; AN 2010-E86056, XP002665404, & JP2010100703 A (Dow Corning Toray Co Ltd) May 6, 2010.

T B Jones, "An electromechanical interpretation of electrowetting", Institute of Physics Publishing, Journal of Micromechanics and Microengineering, 15 (2005) pp. 1184-1187.

Im et al., "Electrowetting on a Polymer Microlens Array", Langmuir 2010, 26(14), pp. 12443-12447, published online May 13, 2010.

Jason Heikenfeld et al., "Electrowetting on Superhydrophobic Surfaces: Present Status and Prospects", Journal of Adhesion Science and Technology 22 (2008) pp. 318-334.

Kailash Bhat, "Electrowetting Textiles—A New Paradigm for Tuning of Textile Wettability"; A thesis submitted to the Division of Research and Advanced Studies of the University of Cincinnati, dated Aug. 8, 2007.

Steckl et al.; "Electrowetting: a flexible electronic-paper technology"; Nanoelectronics Laboratory; University of Cincinnati, Cincinnati, OHIO; SPIE Newsroom 2011, 10.1117/2.1201101.003443.

Frieder Mugele, et al., "Electrowetting: from basics to applications"; J. Phys.: Condens. Matter 17 (2005) R705-R774; Published Jul. 1, 2005.

Zhang et al., "Enhanced and Reversible Contact Angle Modulation of Ionic Liquids in Oil and under AC Electric Field"; ChemPhysChem 2010, 11, pp. 2327-2331, published online on Jun. 16, 2010.

Bhat et al., "Nonwoven electrowetting textiles", Applied Physics Letters 91, 024103, 2007, American Institute of Physics; published online Jul. 11, 2007.

Dhindsa et al., "Reversible Electrowetting of Vertically Aligned Superhydrophobic Carbon Nanofibers", Langmuir 2006, vol. 22, No. 21, pp. 9030-9034, published online on Sep. 15, 2006.

Hsieh et al., "Tunable Microfluidic Optical-Fiber Devices Based on Electrowetting Pumps and Plastic Microchannels", IEEE Photonics Technology Letters, vol. 15, No. 1, Jan. 2003, pp. 81-83.

(56) References Cited

OTHER PUBLICATIONS

English summary of JP 2010-100703 obtained from EPO website and identified by Document No. XP002665404.
English translation of International Search Report and Written Opinion of the International Searching Authority for related application No. PCT/EP2011/068567, and examined claims 1-33.
English translation of International Search Report and Written Opinion of the International Searching Authority for related application No. PCT/EP2011/068571, and examined claims 1-34.
English translation of International Search Report and Written Opinion of the International Searching Authority for related application No. PCT/EP2011/068574, and examined claims 1-33.
English translation of International Search Report and Written Opinion of the International Searching Authority for related application No. PCT/EP2011/068679, and examined claims 1-23.
English translation of International Search Report and Written Opinion of the International Searching Authority for related application No. PCT/EP2011/068577, and examined claims 1-27.
Extended European Search Report from the European Patent Office dated Jul. 22, 2015 in related EP application No. 11 773 272.7, including European Search Opinion, European Search Report, and examined claims 1-15.
Extended European Search Report from the European Patent Office dated Jul. 22, 2015 in related EP application No. 11 773 469.9, including European Search Opinion, European Search Report, and examined claims 1-15.
Extended European Search Report from the European Patent Office dated Jul. 22, 2015 in related EP application No. 11 774 055.5, including European Search Opinion, European Search Report, and examined claims 1-15.
Extended European Search Report from the European Patent Office dated Jul. 22, 2015 in related EP application No. 11 776 743.4, including European Search Opinion, European Search Report, and examined claims 1-15.
Extended European Search Report from the European Patent Office dated Jul. 22, 2015 in related EP application No. 11 784 444.9, including European Search Opinion, European Search Report, and examined claims 1-15.
Xiefei Zhang, et al., "Strong Carbon-Nanotube Fibers Spun from Long Carbon-Nanotube Arrays", Small, vol. 3, No. 2, Feb. 5, 2007, pp. 244-248.

* cited by examiner

LUBRICANT SYSTEM AND METHOD OF FORMING THE SAME

CROSS-REFERENCE

The application is the U.S. national stage of International Application No. PCT/EP2011/068574 filed on Oct. 24, 2011, which claims priority to U.S. Provisional Application No. 61/406,416 filed on Oct. 25, 2010, U.S. Provisional Application No. 61/418,081 filed on Nov. 30, 2010, U.S. Provisional Application No. 61/421,985 filed on Dec. 10, 2010 and U.S. Provisional Application No. 61/426,083 filed on Dec. 22, 2010, the contents of all of which are incorporated by reference as if fully set forth herein.

TECHNICAL FIELD

The present invention relates to a lubricant system and a method of forming the same.

BACKGROUND OF THE INVENTION

US 2005/0197260 discloses an environmentally-friendly grease composition comprising a vegetable oil and a cellulose fiber, as well as also glycerin, a rust inhibitor and/or fatty acid ester, lecithin and/or phophatidyl choline.

U.S. Pat. No. 6,482,780 discloses a grease composition for a roller bearing comprising a metal soap-based thickening agent containing a long fiber-like material having a major axis length of at least 3 microns incorporated in a base oil comprising a lubricant having a polar group in its molecular structure and a non-polar lubricant blended in combination.

U.S. Pat. No. 5,874,391 discloses a polymer-thickened grease that is prepared by mixing a polymer, such as polypropylene, with a base oil and heating the mixture to fully dissolve the polymer in the base oil. The heated mixture is then rapidly cooled or quenched.

U.S. Pat. No. 5,415,791 discloses a lubricating composition for solid lubricant-embedded sliding members comprising 5 to 78% by weight of a solid lubricant powder material, 5 to 30% by weight of a lubricating oil which is in a liquid or paste form at ordinary temperatures, 1 to 15% by weight of a carrier for absorbing and retaining said lubricating oil, and 15 to 50% by weight of a thermosetting synthetic resin binder. The carrier may be an oleophilic fiber, such as cellulose fiber and polypropylene fiber.

SUMMARY OF THE INVENTION

It is an object of the present teachings to disclose an improved lubricant system and a method for forming the same.

This object is achieved by the inventions of claims 1 and 33, respectively.

Further developments of the invention are recited in the dependent claims.

According to a first aspect of the present teachings, a dispersion of oleophilic micro fibers or nano fibers having a very high surface/volume ratio in an oil or other conventional lubricating liquid can be used to produce a lubricant that, at least in certain embodiments, may be capable of carrying up to 100 times its weight of the oil or other lubricating liquid. This aspect is significant in that the structure functionality and formation are made substantially independent of the material.

A thickened lubricant, such as a grease or a solid oil, may be prepared by dispersing such fibers, e.g., in a loose state, in the oil or other base lubricating fluid so that the resulting lubricant will have a structured three-dimensional network, which is able to retain and also release the base lubricating fluid, e.g., an oil. This structure can be created by using nano- and/or micro-polymeric fibers that are produced prior to the formation of the lubricant or grease. The polymeric fibers generally maintain their shape when contacted with the oil or other base lubricating fluid, i.e. at least a portion of the polymeric fibers do not dissolve or melt into the oil or other base lubricating fluid during operation or usage.

In addition or in the alternative, the fibers according to the present teachings may be disposed on a surface in need of lubrication. An oil or other base lubricating fluid is then brought into contact with the surface having the fibers thereon, whereby a lubricant (e.g., a semi-solid lubricant, such as a grease) spontaneously forms by interacting with the fibers.

In addition or in the alternative, the fibers may be provided in the form of a fabric material, such as a non-woven pad, mat or cloth. The fabric material may be affixed to a surface in need of lubrication and then the oil or other base lubricating fluid can be brought into contact with the surface/fabric material, thereby spontaneously forming the lubricant, as in the previous embodiment. In addition or in the alternative, the fabric material may be dispersed (e.g., after being broken up into small pieces) in the oil or other base lubricating fluid in a manner similar to the loose fibers described above.

Since the fibers can be produced from a wide range of materials, the present teachings advantageously enable a wide flexibility or choice in the selection of the structuring (fiber or fibrous) material. The material can be selected to satisfy very specific operating conditions and/or to impart the lubricant or grease with advantageous properties, such as temperature stability, particular oil bleeding characteristics, etc. Thus, according to this aspect of the present teachings, refinements are possible in the physics and chemical tuning of the performance (lubrication, bleeding, fiber reinforcing, etc) as well as the particular processes for making and delivering this lubricant into the systems in need of lubrication.

As utilized in the present teachings, the term "oleophilic" means that the surface of a flat piece of the material (i.e. the material that will be used to form the oleophilic fibers or fibrous material) will be readily covered (wetted) by oil or another base lubricating fluid, because that will reduce the total surface energy of the system. A porous structure of an oleophilic material will absorb oil, like a sponge, through capillary action. The more oleophilic the material is, the smaller the "contact angle" of the drop of oil on a flat smooth surface of such material will be, which makes the contact angle a suitable measure of the degree of oleophilicity in accordance with the present teachings. In principle, if a small drop of oil exhibits an inner contact angle that is less 90 degrees when dropped onto a material, such material can be considered oleophilic. A higher degree of oleophilicity of the fibrous materials according to the present teachings (i.e. a smaller contact angle) may be more advantageous in certain embodiments.

DETAILED DESCRIPTION OF THE INVENTION

Figure 1:
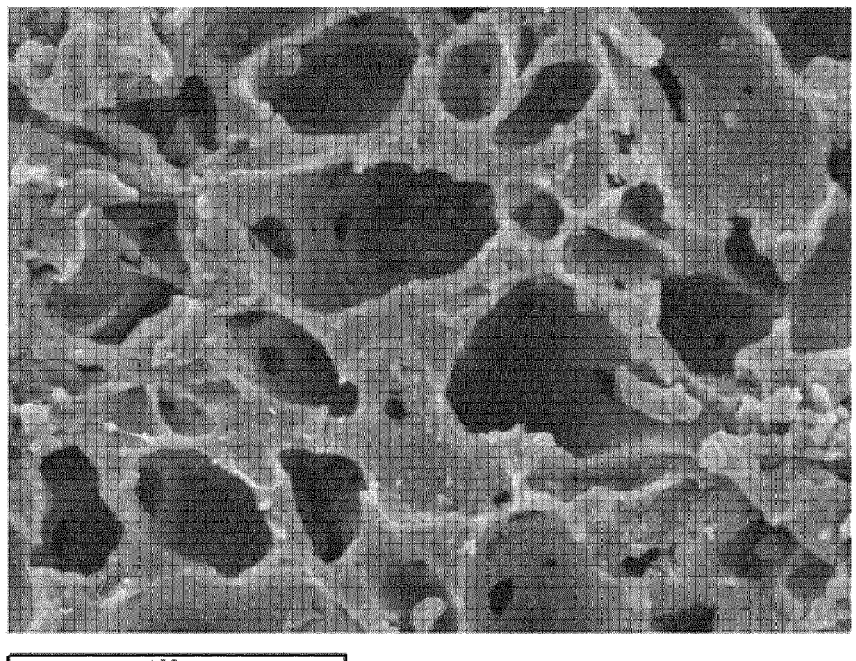
FIG. 1 shows oil reservoirs defined in an elastomeric seal lip according to one aspect of the present teachings.

As an initial matter, it is noted that the present teachings may be utilized with a wide variety of fluids, e.g., oils or other base lubricating fluids, that exhibit lubricating properties at the operating temperatures appropriate for various applications.

Particularly suitable lubricants (oils) include, but are not limited to, mineral oils obtained from crude oil, group I, II and III lubricants, group IV lubricants (polyalphaolefins "PAO") and group V lubricants (all others).

A more particular, but non-limiting, list of lubricating oils includes mineral oils, synthetic esters, and plant-based oils and their derivatives, such as oils derived from rapeseed, canola, sunflower, canola, and palm. Animal-based oils, their derivatives and synthetic lubricants also may be suitably used in certain aspects of the present teaching including, but not limited to, polyglycols (PG), polyalkylene glycol (PAG), white oils, silicone oils, very-high viscosity index oils (VHVI), water, glycerol and waxes.

Particularly preferred oils according to the present teachings are mineral oils, synthetic esters, PAOs and synthetic hydrocarbons.

The viscosity of the lubricating fluid (oil) can range from very low (below 1 cSt at 40° C.) to very high (several 1000 cSt at 40° C.). The most suitable viscosity depends on the application temperature, operating (e.g., rotating) speed, etc., and the present teachings provide for a wide variety of possible lubricating properties. However, particularly preferred are any of the above oil types that have a viscosity between 10 and 300 cSt at 40° C.

The oleophilic fibers that may be utilized to thicken the lubrication fluids or oils according to the present teachings can be made, e.g., from any type of polymeric materials that can be spun into fibers, as well as in conjunction with optional additives. Suitable polymers include, but are not limited to, polyamide (PA), nylon 6,6, polyamide-6,6 (PA-6,6), polyamide-4,6 (PA-4,6), polyurethanes (PU), polybenzimidazole (PBI), polycarbonate (PC), polyacrylinitrile (PAN), acrylonitrile rubber (NBR), polyvinylalcohol (PVA), polylactic acid (PLA), polyethylene-co-vinyl-acetate (PEVA), polymethacryate (PMMA), tetrahydroperfluorooctylacrylate (TAN), polyethylene oxide (PEO), collagen-PEO, polyaniline (PANT), polystyrene (PS), silk-like polymer with fibronectin functionality, polyvinylcarbazole, polyethylene terephtalate (PET), polyacrylic acid (PAA), polypyrene methanol (PM), polyvinylphenol (PVP), polyvinylchloride (PVC), cellulose acetate (CA), polyacrylamide (PAA), poly (lactic-co-glycolic acid) (PLGA), collagen, polycaprolactone (PCL), poly(2-hydroxyethyl methacrylate) (HEMA), poly (vinylidene fluoride) (PVDF), polyether imide (PEI), polyethylene glycol (PEG), poly(ferrocenyldimethylsilane) (PFDMS), poly(ethylene-co-vinyl alcohol), polyvinyl pyrrolidone (PVP), polymetha-phenylene isophthalamide, polypropylene (PP), polyethylene naphthalate (PEN), Teflon®, polytetrafluorethene (PTFE), waxes, waxy polymers, polyolefins, polyesters and polysulfones.

PP and PA are particularly preferred.

In addition or in the alternative, polymers derived from natural or biodegradable sources are also suitable for making fibers that can be utilized with the present teachings, in particular for the production of biodegradable greases. Representative examples of such polymers include, but are not limited to, polysaccharides, such as cellulose, starch, chitin, chitosan, proteins, (poly)peptides and gelatin.

Of course, mixtures or blends of two or more of the above-noted polymers are suitable as well. All possible combinations of two or more of the above-mentioned polymers are understood as being expressly enumerated for the purposes of original description.

In one aspect of the present teachings, a small fraction (e.g., 0.1-5%) of fibers of one type can be added to grease that primarily contains a second type of fiber so as to impart special properties to the grease. For example, the fibers can be designed to melt at elevated temperatures to form a lubricant. In addition or in the alternative, the fibers can contain additives. In addition or in the alternative, the fibers can provide a structural function in the lubricant or grease.

Mixtures of two types of fibers A and B in a ratio A:B between 10:90 and 50:50 can be utilized to impart unique properties to the lubricant or grease.

The fibers can be between 0.1 and 100 wt % of the final material. A material having 50-100 wt % of fiber can also function as a 'dry' lubricant, preferably if part or all of the fiber melts under application (usage) conditions (e.g., pressure, temperature, shear stress) and forms a lubricant.

At increasing fiber density, the consistency will increase, which is a significant grease composition parameter. The most suitable fiber densities will depend on the desired grease consistency for a particular application (usage).

In another aspect of the present teachings, a micro/nano fiber network can be prepared that will naturally embed, incorporate or absorb oil or another suitable base lubricating fluid, such that the overall process for making the lubricant is simplified to a great extent. Fibers can be made from a variety of different materials mentioned above and the length/diameter ratio of the fibers, as well as the chemical composition (bulk or surface) thereof, can be tuned or suitably selected, as was mentioned above, using a variety of different existing processes that are inherently low cost in nature. The construction of a soap-like or sponge-like structure by forming a cloth, pad, fabric, mat or sponge-like network from the fibers described herein, or by appropriately dispersing the fibers in an appropriate lubricant, leads to the generation of new lubricants with one or more specific properties that are believed to be new in the grease/lubricant field.

Thus, in another aspect of the present teachings, a cloth, pad, fabric or mat material can be produced from a variety of different polymer materials, such as the fiber materials mentioned above. In addition, the cloth material may also be made with suitable lubrication additives included within or in the surface of the fibrous network, e.g., a non-woven fibrous network. This provides flexibility in producing unique, low weight structures that will only require the addition of an oil or another base lubricating fluid in order to form the lubricant, such as a grease. The properties of the fibers can be tuned or suitably selected or treated in order to adjust the physical properties (e.g., length, diameter, mixture, etc.) and/or the chemical properties (surface treatment, bulk material, wetting behavior, etc.), which selection and/or treatment will enable the fibers to be suitably adapted to any type of lubricating fluid.

In other embodiments, the fibers can be cut to a specific length and thus the fibers can be utilized in a loose or dispersable state. In another method for preparing fibers of a shorter length then has been available in the past, a cloth or fabric made of the fibers may be frozen and then the polymeric fibers are crushed while they are in a brittle state.

Such non-woven fiber fabrics mats can be made, e.g., by melt blowing micron or sub-micron diameter fibers, or by electro-spinning. In addition, fiber material mats/cloths that may be advantageously utilized with the present teachings can also be obtained from commercial sources, such as Hills Inc. of W. Melbourne, Florida, U.S.A.

A soap-like structure made of micro/nano fibers will not require a heating and cooling process to form the grease, or will require only a minimal heating/cooling process. The fiber network may be organic and/or inorganic. The fiber fabrication method may be made compatible with a very large volume production.

The diameter of the fibers is preferably in the micron or nanometer range, while the length of the fibers is preferably in the range of several to tens of microns, most preferably less than 30 microns (μm). Preferably, nanoparticle materials (i.e. nanometer-sized particles having a low aspect ratio, e.g., about 1) that could present health hazards, which would limit their application, may be avoided.

The fiber diameters are between 50 nm and 10 microns, more preferably between 100 nm and 1 micron. Further, the fibers have a length that is at least 5-10 times the diameter thereof. That is, the fibers preferably have an aspect ratio of at least 5 to 10. The length of the fibers can be suitably modified to effect desirable changes to the structural properties of the grease, its mechanical stability, and its bulk rheological properties. Thus, the fiber length can be optimized for particular application (usage) conditions.

The base material for the fibers can be produced and tuned/adapted for a specific application. For example, the base material can also be sent to a final user as a cloth/fabric material or a network of pre-cut fibers. In this case, the final user would only need to add oil (and perform a simple mixing procedure) to produce the lubricant or grease. This aspect of the present teachings provides a great degree of flexibility, because the base material can be shipped worldwide relatively inexpensively, due to its low weight (i.e. unlike oil or greases, which are relatively heavy).

The fibers, any fabric or network-like materials made from the fibers, the lubricant fluid/oil and/or the thickened lubricant (e.g., grease) according to the present teachings may include one or more known additives that are commonly used in the lubricant field. The additives may be included to give the lubricant special functionality with respect to the aging of the lubricant (e.g., anti-oxidants), friction reducers, anti-wear, extreme pressure properties, etc.

Additives can also be added to give the lubricant or grease a stronger structure by linking or connecting (e.g., bonding) the fibers using suitable polymers, waxes or the like. Fibers having different properties can be used as additives as well.

Other suitable additives include ceramic particulates (silica, aluminia, zirconia, etc) and metallic particles.

The additives can be added to the polymer bulk base before the fibers are produced, but could also be added to the dry fibers. Small quantities of a carrier fluid (very suitable is a lubricant with or without additive) can also be added to the dry polymer base material. The oil or lubricating fluid then can be subsequently added to make the final formulation of the thickened lubricant, e.g., the grease.

The additive(s) can also be added to the oil, which is then mixed and homogenized with the fibers or fibrous material (e.g., the cloth/fabric made from the fibers).

In another aspect of the present teachings, the fibers themselves may serve as an additive. For example, the fibers disclosed herein may be added to known lubricants (e.g., oil, greases and emulsions) to improve the lubrication and tribological performance thereof.

In another aspect of the present teachings, different materials or material properties can be mixed or combined in the same fiber, thereby achieving a phase separation and heterogeneous fibers. Consequently, a differentiated or dual behavior can be achieved in a single fiber. Such multi-property or multi-phase fibers may be referred to as a "JANUS fiber" after the Greek god who had two faces. Such multi-property or multi-phase fibers are highly advantageous to the development of mechanical stability (when needed) and to the ability of the lubricant/grease to self heal. That is, after some type of disruptive mechanical action (e.g. shearing), the fiber structure may preferably heal itself (e.g., self re-assembly) once again into the desired structure (network).

The Janus fibers can be produced according to a variety of methods. For example, the fibers can be subjected to a spray treatment, a plasma treatment and/or deposition process that exposes the fiber on one side. A deposition material can be a metal, polymer, small ceramic, metallic or organic nanoparticulates that is/are embedded into or attached to the fiber on one side, e.g., the exposed side. This can be done either during the production of the fibers or after the production thereof. The deposition will create fibers with different properties on the exposed and the unexposed sides. Another way is to prepare two different types of polymers in parallel and then form them into one single fiber using existing micro-scale extrusion techniques. These are sometimes referred to as Island-In-Sea fibers in which a plurality of nano or micron-scale (bi-component) fibers are extruded in a matrix of a third polymer.

Another aspect of the present teachings relates to improve lubrication systems, e.g., for bearings, linear actuators, gears and any other mechanical raceway, track or sliding surface.

For example, in this aspect, fibers of the present teachings can be rubbed onto (or otherwise applied to or deposited on) a sliding surface of a device, such as the raceway of a bearing, a gear or a linear device (motor), in order to form a local deposit of the fibers that will provide an oil swollen local reservoir. The fibers can be applied as a preservative measure in order to provide both a better "running-in" of the device and a better long term storage resistance of the mechanical components. This feature of the present teachings provides grease-like local lubrication in an oil-lubricated system (e.g., such as an industrial gearbox). Because the effect is achieved in-situ, it leads to longer surface life and local elimination of the oil starvation phenomena.

Even without the mechanical pre-treatment, the present teachings may be applied to provide a layer on the surface, which layer is made by mixing a fiber (predominantly) and lubricant. The resulting dynamic coating will self-regenerate during subsequent cycles and will protect the surface. As the fibers may be pre-treated with any suitable additives (e.g., low friction, anti-wear, and/or anti-oxidation agents), they can act as long-lasting, slow-release agents in order to enhance the lubrication function and to ensure longer service life of the mechanical surfaces.

Various embodiments, features and advantages of the present teachings will now be described in more detail in the following.

Solid Lubricant or Solid Oil

In the past, known "solid oil" products have been made by saturating a polymer matrix with oil. Such solid oils have an oil content of up to 70%, but are much harder than is usual for lubricating greases. Due to the relatively stiff mechanical structure, they can provide more support than greases, while the relatively high oil content provides better lubrication than can be achieved by pure polymer materials.

A fiber-thickened grease according to the present teachings can be prepared such that it has a comparable stiffness to known solid oils and similar materials and therefore has the same functionality. However, in this aspect of the present teachings, performance can also be improved as compared to known solid oils, because the fibers themselves can also act as a lubricant, i.e. the fibers supplement the lubricating properties of the base oil. For example, in such embodiments, fibrous material may shear off during operation, thereby increasing the gap between the functional surface and the "grease" that reduces friction. If lubricating fibers enter the contact, they can provide additional lubrication.

In addition, by tuning the oleophilic properties of the present fibers, e.g., by coating or treating the fibers, the oil bleeding rate of the resulting grease can be tuned, e.g., for various bearing applications. By making a solid oil using very viscous fiber-thickened grease in accordance with the present teachings, different solid oil products can be easily formulated for different bearing types/operating conditions.

Such solid oils preferably have a hardness values between 1% and 100% of the hardness of the base material of the polymer fibers.

Thickened Lubricants

In another aspect of the present teachings, lubricants are provided in the form thickened oils and greases. More specifically, lubricating fluids or oils are thickened with fibers according to the present teachings. While the most appropriate consistency is often determined by the application or usage of the thickened lubricant, the NLGI grade or consistency (the standard set or determined by the National Lubricating Grease Institute) is preferably equal to or greater than 00. More preferably, lubricants according to the present teachings have a consistency or NLGI grade between 1 and 3, e.g., 2. Such thickened greases are particularly suitable for usage in bearings.

The optimal fiber density of the thickened lubricant will depend on the required viscosity and consistency of the lubricant for the particular application, as well as the length and diameters of the fibers utilized to thicken the lubricating fluid or oil. However, it is noted that preferred fiber weight densities (based on the total lubricant weight) for a fiber-thickened lubricant are generally between about 0.1 and 20%. Preferred fiber densities for a fiber-thickened 'grease' are generally about 2-15%, more preferably between about 5-12%. But, in case the fibers are used in conjunction with other thickeners, the fiber content may be reduced accordingly.

Controlled Release of Oil

In certain aspect of the present teachings, the bleeding properties of the oleophilic fiber-thickened lubricants and greases according to the present teachings can be controlled in several different ways by designing the fibrous structure such that it responds to an external stimulus, such as temperature, electric signals, etc.

In one exemplary example, pH can be used to control the release of oil. In this regard, it is noted that aging of oil can lead to an increase in the Total Acid Number (TAN) of the oil and this property can be used to increase oil supply with time. For example, structural integrity, oleophilicity and/or shrinking of the product occur with changes in pH or specific chemicals that are released over time. In an alternative solution according to the present teachings, the structural change and hence oil release can be triggered by the consumption of an additive.

In addition, some polymers exhibit an inverse thermal expansion behavior, i.e. they contract or shrink with temperature increases. Fibers prepared from such polymers will act as a self regulating bleeding pump by pumping (sponge contraction) or bleeding (releasing) more oil out of the grease when the temperature increases.

Therefore, in certain aspects of the present teachings a polymer fiber can be used that shrinks or contracts at elevated temperatures, which will have the effect of causing a squeezing or contraction of the fiber network that will, in turn, release (discharge) oil from the grease when the temperature increases. While such materials exist, the contraction/shrinking is usually an irreversible process. However, this shrinkage property may be advantageous in applications that require an emergency release of oil, which will be further described below.

In addition or in the alternative, the release mechanisms can be activated electrically by either induced heating or by having electro-active polymers forming a part of the soap or network structure of the grease.

In some applications of the present lubricants (e.g., helicopter gearboxes), it may become necessary during operation to rapidly release almost the entire amount of oil still trapped in the fibrous network of the grease. Generally speaking, 90% of all oil available in the lubricant system is located inside the polymer matrix or grease soap during normal operation.

For an emergency oil release, both gradual and fast release mechanisms are possible. In the gradual release, the inverse thermal expansion behavior of some polymers may be advantageously utilized. As was indicated above, the shrinkage of the polymer material at elevated temperatures is an irreversible mechanism, but it facilitates a gradual increase in the release of oil as the network shrinks while the temperature of the system increases. This shrinkage action pumps oil out of the fibrous network and into the contact where additional oil may be urgently needed to prevent a mechanical breakdown.

Another gradual release mechanism involves the use of a grease comprising at least two different types of fibers, in which (at least) one of the fibers has a different melting point than the other(s), as was discussed above. Initial melting of the low melting point fiber will impart a double benefit: a faster release of oil and the transferring of the melted fiber to the surface that will be coated and protected.

Fast release mechanisms may involve chemical and electrical triggers to selectively dissolve or melt the fibers for a fast and irreversible release of the oil buffer contained in the grease, as was discussed above.

Improved Shelf Life

Oil separation typically takes place when grease is stored for long periods of time, e.g., in a drum. In this case, the oil becomes visible as an oil layer on top of the grease. In general, the oil is lighter or less dense than the soap or other thickening material, so that the oil will float on the remaining grease. This separation phenomenon governs the "shelf life" of the grease, i.e. the amount of time that the grease may be safely stored before using. Release of oil 'on the shelf' is therefore undesirable, and this presents a challenge, because the grease must be capable of bleeding sufficient oil in order to function as a good lubricant during operation. Therefore, shelf life and sufficient bleeding characteristics during usage need to be suitably balanced.

Oleophilic fiber-thickened greases according to the present teachings can be prepared that exhibit a longer shelf life. In particular, two parameters may be controlled to influence the shelf life.

First, progressive structural changes affect the thickener (fiber) structure. These are influenced by the ability of the structure to retain the oil and hence to the affinity between the oil and the structure. A highly oleophilic structure will retain the oil better than an oleophobic structure. Furthermore, the stability of the structure can be optimized as described elsewhere in this specification.

Second, the buoyancy of the thickening material in the oil also affects the shelf life. The thickener can be designed such that the specific mass (density) is almost equal to the specific mass (density) of the oil or lubricating fluid comprised in the grease. In this case, the oil or lubricating fluid is less able to float on top of the remaining grease, because they have equal or substantially equal specific masses.

In addition or in the alternative, the fibers can be coated or treated or thus selected in a manner that will maintain the base oil inside the fiber network (oleophilic properties) for a longer period of time.

The oleophilicity of the fibers can be determined according to a variety of techniques that are known in the surface science field. For example, as was described above, the contact angle of a drop of oil or lubricating fluid on a smooth flat surface of the same material as the fiber may provide one indication of the oleophilicity of the fiber. In this case, the lower or shallower the internal contact angle, the more oleophilic the material is. The oil is said to 'wet' the material when the internal contact angle is very shallow. Another method for indicating oleophilicity is to determine the volume of oil that a cloth or other structure (e.g., fabric) made of the fibers can absorb.

The Fiber Network

As was noted above, the structure functionality and formation of the lubricant or grease can be made independent of the material.

The polymer fiber network according to the present teachings can be designed so that it retains solid additive particulates within the fiber network and independently of any treatment performed on the fibers themselves. The size of these particulates can be nano-, micro- or meso-scale. Particulates having a size on the order of tens of microns are known as mesoparticles. In this aspect of the present teachings, the retention of a particulate "additives reservoir" in the fiber network can be provided.

Nano-, micro- and meso-scale particles having anti-wear properties (for example, by admixing non-dissolved zinc dialkyldithiophosphate, ZDDP), anti-friction or friction-reducing properties (for example, by admixing one or more of $MoS_2$, $WS_2$, and/or PTFE), anti-oxidant properties, and/or anti-corrosion properties can be added as ingredients in the "structure forming" (i.e. fiber network making) process. Anti-corrosion additives and preservatives can also be incorporated into the fiber network.

In addition or in the alternative, if the fibers are treated such that certain additives will adhere thereto, a fiber structure will result that incorporates the required additive/chemistry. That is, the required or desired property or properties is/are present in the lubrication system as long the fibers are contained in the lubrication system, e.g., as a network or as a suspension/dispersion (e.g. a paste). For example, corrosion protection surfaces may be provided by the fiber structure in case an oil type will/can not function and a 'paint' type is not desired.

High-Temperature Applications of the Present Lubricants

The above-mentioned known polymer-thickened grease technology disclosed in U.S. Pat. No. 5,874,391 is based on fully dissolving polypropylene (PP) in a base oil and uses the fact that a three-dimensional, phase-separated polymer structure is created if a relatively fast cooling rate is applied to the heated PP-oil mix. However, this technique has limited applications, because the grease is very particular to the polymer PP and quenching rate. Therefore, the structure will lose its structure at operating temperatures above the PP melting temperature, whilst significant softening starts well below this temperature, such that the grease is suitable only for low to medium temperature applications.

On the other hand, one aspect of the present teachings distinguishes from known polymer-thickened grease technologies in that the structure is rendered substantially independent from the material and hence a grease-like structure can be obtained for a wide range of polymer fiber materials. This avoids or eliminates the operating temperature limit that exists for the above-mentioned known polymer-thickened grease technology.

Thus, in this application of the present teachings, a low to medium melt-temperature polymer with lubricating properties in the fluid state (such as polypropylene (PP)) can be mixed with a fiber that is stable at relatively high temperatures. At the high temperature, the lower melt-temperature lubricating polymer will start to melt, thereby improving the lubricating properties of the grease. In addition or in the alternative, a fiber thickener may be utilized that has good lubricating properties in its own right, such as PTFE, which exhibits high-temperature stability as well. Other very suitable candidates include, but are not limited to, polysulfonates and other low melting PTFEs.

It is preferred to integrate a PTFE or PES-type polymer into the fiber structure, which will provide high temperature stability. Due to the inertness of PTFE, there will be little adhesion of these polymers to the surfaces that need to be lubricated. Such adhesion issues can be overcome by mixing the high-temperature-stable fibers with other polymeric fibers that have higher adhesion properties, such as for example PP. Thus, a mixture, e.g., of PP with PTFE and/or PES (and/or another polymer) can improve the wetting/adhesion properties at high temperatures.

For example, as was mentioned above, a polymer may be used that will melt at a predetermined temperature, at which it begins to act as a lubricant. If a mixture of polymer fibers having a range of melting temperatures is mixed into the structure of the grease, they will sequentially melt as the temperature increases. This would provide the advantageous property that the fibrous polymers, which are incorporated (trapped) into the matrix of the grease, will not easily leak out until they start melting.

Fibers made from waxes as well as a mix of low molecular weight polymers combined with high molecular weight oils also provide advantages for high temperature applications. In practice, the molecular weight that can be used remains limited to the limits of the melt blow (or alternative) production process utilized to form the fibers.

For example, a low molecular weight component of the polymer may act as a cross-link between strands of high molecular weight material. In this case, by adding, e.g., a 'waxy' polymer (i.e., low molecular weight variant to the fiber chemistry) to the mixture, the mechanical stability of the grease will be improved by the formation of a physical connection between loose strands of fiber.

The thickener preferably lubricates when it itself enters a tribological contact, for example between a roller body and a raceway, such as exists in a bearing or another mechanical device. It is likely that the thickener will enter the contacts when the grease bleeds and it will be beneficial that the thickener itself has lubricating properties.

If the above-mentioned properties can be influenced, a low melting polymer can be processed together with a high melting point polymer, whereby the first can contribute to the lubrication properties and the second can maintain the necessary stability of the lubricant, even at high temperatures.

High Speed Applications of the Present Lubricants

The present teachings may be advantageously utilized in a variety of different applications with suitable modifications, including but not limited to use in high speed and/or high temperature applications. The bleeding property of the lubricant or grease can be tuned by adjusting the fiber mix as was described above. In addition or in the alternative, the thermal and electric conductivity can be tuned and enhanced based on the nature, density and mix of the fiber network. Thermal conductivity is very advantageous as it helps to reduce the temperature of high speed and high temperatures applications and lowers the risk of reaching temperature limits that are defined by the materials used in the application, such as the lubricating oil(s), the polymer material(s), and the to-be-lubricated surface(s), such as a bearing cage.

In this aspect of the present teachings, fibers made from waxes, as well as combinations of low molecular weight polymers combined with high molecular weight oils, may be advantageously utilized. Waxes are good natural lubricants when pushed into the contacts.

The materials according to this aspect of the present teachings (fibrous greases or porous networks) can be designed such that they will start to bleed oil at high speeds due to centrifugal forces. This feature of the present teachings is particularly advantageous in bearing applications, in which one or more cage bars are present, such as in cylindrical roller bearings (CRB), on which a lubricating grease resides. At low speeds, these greases preferably do not bleed oil, and only release oil at high speeds.

A preferred grease preferably has a high yield stress and well-balanced or uniform (even) bleeding characteristics. The high yield stress can easily be obtained with the fiber-thickened greases according to the present teachings, because all the fibers themselves exhibit strong solid-like rheological properties. This relates in part to the possibility to fabricate a solid oil-like grease as described above.

At high speeds, centrifugal forces usually result in the oil being excessively depleted from the inner ring of a bearing. The wetting behavior of the present greases enables them to capture a portion of the oil mist present inside the bearing during high speed applications. If located in the inner ring, a parallel recirculation (absorption) of oil back to the inner ring will be created, thereby preventing excessive oil depletion as well as increasing the service life of the bearing.

On the other hand, the bleeding rate could be too low if the oil-retaining properties are too strong. In this case, no bleeding would occur, which would result in no effective lubrication. This risk can be mitigated by increasing the bleeding rate by adjusting the oil affinity and mechanical stability of the fiber network.

Alternate Polymer Formulations for the Fibers

At least some of the above-noted polymers are based on using identical polymers with differing molecular weights. Two different polymers can potentially also be used. Some examples include:

Charged and/or polar fibers, e.g. PAA-PM or PTFE, may be combined with a (possibly low MW) oil dissolved polymer having the opposite charge or polarity.

Amorphous fibers may be combined with a compatible semi-crystalline connecting polymer (e.g., PEI fiber and PEEK).

Other possibilities include crystalline polymers, e.g., different polyesters, or other polymers with compatible surface energy, e.g., polyamides having different polarity, e.g., different carbon chain length per repeat unit, ranging up to PE which, when amide terminated, can conceptually be considered as PA infinite.

Further possibilities include the use of block-copolymers that are compatible with the fibers, e.g., co-polyamides or co-polyesters with polyamide or polyester fibers, respectively.

The rheological properties of hot-melt polyamides determine the glass-transition state in the polyamide. One of the very interesting consequences of this is that the behavior of this material is related not only to a favorable hydrophilic/hydrophobic balance for lubricating oils, but it also provides unique temperature-driven behavior and rheological behavior. The polymers can be chosen such that the glass transition state is any temperature between 60-280° C.

Further, the flexibility of the material, e.g., the tensile strength, modulus, elongation etc., can all be tuned. In light of the above discussion concerning the potential mechanical weakness, the H-bonding capacity of polyamide bonds makes them particularly advantageous. In addition, amides having functional side groups for cross-linking can be incorporated.

Improved Mechanical Stability of Greases According to the Present Teachings

One important property of grease is its mechanical stability, by which is meant the ability of the grease to maintain its rheological properties after what is called working or over-rolling. Usually, the consistency of a grease decreases after being mechanically 'worked' or stirred.

The mechanical stability of a complex fluid, such as grease, can be improved if the structure is able to self-assemble after mechanical shearing action into a structure that is similar to its structure before the disruptive action. For this re-assembly to occur, the basic building blocks of the structure (in this case nano- and micro-porous fibers) should self assemble into the original structure.

There are several options for achieving such self-assembly properties.

For example, either the entire fiber or a portion thereof may have a preferential affinity towards each other. This self-attracting affinity may be greater than the affinity of the fiber to the lubricating oil. In this case, the fibers will self-assemble and form a percolating network that provides the sponge-like/grease structure. By manipulating/adjusting/controlling these affinities relative to each other and to the oil, a wide range of structures can, in principle, be formed with varying amounts of mechanical stability and yield stress.

Thus, in this aspect of the present teachings, mechanical stability can be increased by introducing areas into the fibers that have a designed affinity towards each other and the lubricating fluid.

Heterogeneous fibers can be constructed, in principle, in many different ways. A few representative, non-limiting examples are provided:

A. The fibers can be randomly coated with a more polar material/composition using a chemical or physical deposition method. For example, if a group of fibers is randomly sprayed with polar coating/particles before being cut into smaller fiber lengths, a random collection of fibers can be obtained, many of which are at least partly polar. In this manner, so-called Janus-type fibers (as described above) can be produced, in which one (or a part of one) side or end of the fiber has a different surface chemistry than the other part or end.

B. Heterogeneous fibers can be produced by mixing two polymers in the polymer melt before the fibers are produced (for example, by melt blowing or another technique). Phase separation in the melt or cooling fluid leads to heterogeneous fibers. Examples known in the art of two non-mixing polymers are legion and are not particularly limited in the present teachings. However, a few specific examples will be mentioned, such as, but not limited to a polar polymer like polyethylene oxide (PEO) and a non-polar polymer such as polystyrene (PS) or polypropylene (PP). The phase-separation and adherence of one phase to the other can be increased by including so-called block co-polymers that are formed by connecting one part of polymer A to another part of polymer B. In the above example, this could be, e.g., PEO-PS or PEO-PP.

For the strength and stability of the grease and its fibers, the properties of the polymer material can be selected to be optimal for the application conditions. Since the fibers will experience shear and compressive forces of varying strength, the fibers should not be too brittle, as breaking of the fibers will cause irreversible destruction of the fiber structure. The fiber material preferably has a relatively low glass transition temperature (Tg), because polymers are more brittle at below their glass transition temperature (Tg) than above it.

An additional advantage is that polymers are more elastic and more 'sticky' above their glass temperature. Elasticity is advantageous in certain application of the present teachings, because the fibers and the overall fiber structure will be able to withstand shear forces better than highly rigid fibers that form a more brittle structure.

Relatively sticky polymers will provide a stronger bond at the locations where two fibers meet. Another benefit is that the friction forces of two fibers sliding over each other will be higher above the Tg and this also increases the strength of the network of entangled fibers.

As a representative example, atactic PP has a Tg of −20° C. Thus, PP fibers are preferably used at temperatures above −20° C., most preferably above −10° C. Similar considerations apply to other polymers and their glass transition temperature Tg.

In general, for low temperature applications, polymers having lower glass transition temperatures should be selected, whereas polymers having higher glass transition temperatures may be used for relatively high temperature applications.

Seals Including Fibers According to the Present Teachings

In another aspect of the present teachings, fibers according to the present teachings (e.g., oleophilic fibers having a length generally between about 50 nm to 10 μm) may be incorporated into a seal, seal-lip or seal-lip dual layer, e.g., of a bearing or shaft seal, in order to reduce friction at the point(s) of contact or along a line of contact. Preferably, these fibers may be made of a low friction type of material (for example, PTFE, wax or similar materials), which does not migrate or bleed out of the resulting lubricant (after contacting the seal with the base lubricating fluid). Alternatively, the oil-adsorbing property of the fibers according to the present teachings will ensure sufficient retention of oil within the sliding contact point or area, thereby reducing friction and wear.

In particular, wax-based or wax-like fibers are presently preferred for incorporation into seals in the dual material seal concept mentioned above.

For example, a nano- or micro-fibrous network can be integrated into a rubber/elastomeric seal in order to supply oil for lubricating the seal contact. This aspect of the present teachings may be utilized to address the following problem. If a seal is not properly lubricated during its operation, an increase in friction will typically result with a corresponding increase in wear and operating temperature, which in turn decreases the service life of the seal.

Thus, in one exemplary embodiment, the fibers or a fibrous network may be simply provided on a smooth surface of the seal (e.g., on the seal lip), e.g., by rubbing the fibers onto the seal surface or by adhering the fibers or a fibrous network onto the seal surface.

In another exemplary embodiment, one or more oil reservoirs, such as is shown in FIG. 1, is/are present or provided in the seal surface close to the point(s) or line of contact of the moving parts. Such oil reservoirs are preferably capable of retaining and then releasing oil to the contact point(s) or line, thereby reducing the likelihood of a poorly lubricated seal. In addition, friction will be reduced, thereby increasing the seal life and sealing ability while also reducing the risk of leakages. Fibers according the present teachings are preferably disposed (e.g., adhered) in such oil reservoirs in order to improve the oil retention/release properties of the oil reservoirs.

Preferably, such oil reservoir(s) is/are located at the 'inside' of the contact. In addition or the alternative, the surface of the metal (steel) that contacts the seal lip may also have recesses adapted to retain oil. The oil reservoir(s) preferably have a largest internal dimension (e.g., an internal diameter) of about 10-200 μm.

In a preferred embodiment of this aspect of the present teachings, an oil-swollen seal lip or counter-face may be utilized. In such embodiments, reduced friction can be achieved by incorporating or absorbing oil into the seal lip materials. In this case, the oil will reside or be located more readily at the contact point(s) (line) of the seal (e.g., elastomer) and metal (e.g., steel shaft), thereby improving the supply of lubricant to the contact point(s) or line in need of lubrication. Reduced friction has many advantages, such as lower energy consumption, lower operating temperatures, and longer seal and lubricant life.

Oil swelling can be achieved by appropriately selecting or matching the affinity of the oil (base lubricating fluid) with the elastomeric material forming the seal, e.g., by appropriately adjusting the amount of acrylo-nitrile content in NBR rubbers. By using a dual material concept, in which the tip is different from the bulk material, shape deformation and other disadvantages relating to excessive swelling can be reduced.

In another embodiment of this aspect of the present teachings, in addition or in the alternative to swelling of the elastomer, the oil reservoirs are provided in the seal lip by creating a porous surface area that is capable of absorbing and/or retaining oil without resulting in significant swelling. The advantage of this aspect of the present teachings is that the properties of the porous elastomer material can be tuned (pore size, material stiffness, etc.) to achieve an optimum reservoir function but ideally also good wear resistance. Swollen elastomer materials are well-known to be more susceptible to degradation and wear.

Therefore, in this aspect of the present teachings, one or more lubricant reservoirs are provided or defined on and/or within a surface of the seal (e.g., the seal lip) that contacts a metal surface during operation, e.g., rotation of the seal lip relative to the metal surface (e.g., a shaft). The lubricant reservoir(s) preferably reduce friction, e.g., in a rotating sealing system, in order to achieve the reduced friction advantages mentioned above. Fibers according to the present teachings may be incorporated, adhered, disposed, etc. in the oil reservoir(s) to improve the oil retention properties.

The seals may be made from porous rubbers and polymers, e.g., nitrile rubber (NBR) and polyurethane (PU) materials, and can be produced according to any suitable technique known in the art. Other materials can, in principle, be used as well. One example is to add salts, such as NaCl or $CaCO_3$, to the elastomer mixture prior to molding. After molding the seal, the salts are washed out of the seal lip using an aqueous solution, thereby creating pores in the surface that are capable of absorbing, retaining and/or storing oil during operation of the seal.

The oil-swollen porous network may then be produced by adhering an oleophilic nano or micro-porous fiber network according to the present teachings to the seal material, e.g., to the above-mentioned pores. The adhesion is preferably strong enough to provide sufficient wear resistance. This can be achieved by using appropriate adhesion chemistry as is well known in the art. This porous network can also be adhered to a seal counterface (opposing) surface.

In another embodiment, a thicker 'pad'-like structure comprising fibers according to the present teachings (e.g., a cloth, fabric, pad, mat, etc., as was discussed above) may be adhered to the seal or onto a counterface surface.

In another embodiment, a heterogeneous mixture of oil-swollen fibrous networks and commonly-used seal materials can be utilized to incorporate pockets of oil-swollen structures into the seal (or counterface) structure.

As the oil reservoir(s) is (are) only needed near the seal lip, the surface layer (liner) may be porous and may be combined with a standard seal material (such as NBR). If the two materials are the same (e.g., both NBR or PU), they can be more readily bonded together during the cross-linking step. This prevents adhesion problems in the bonding layer that might arise when friction forces apply stress to this layer.

Figure 2:
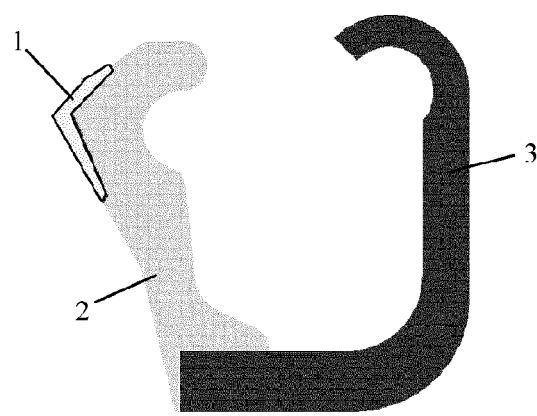
FIG. 2 shows a seal according to the present teachings having a porous liner layer disposed on the seal lip portion.

FIG. 2 shows a schematic example of a representative dual material seal lip comprising a porous liner layer 1 that is capable of absorbing/releasing oil and a bulk seal material 2 that supports the porous liner layer 1. The bulk seal material 2 is attached to a steel support 3 for further support. The porous liner layer 1 is preferably formed according to the above-mentioned embodiments, i.e. fibers are preferably disposed in oil reservoirs defined in the layer. The fibers may be embedded or incorporated into the material of the porous liner layer 1, e.g., by mixing the fibers with a suitable elastomeric material prior to molding. However, the fibers may also be adhered to the porous liner layer 1 after the porous liner layer 1 has been formed or the fibers may even by simply deposited onto the surface of the porous liner layer 1, e.g. by rubbing or spraying or otherwise coating.

Bearing Cages Including Fibers According to the Present Teachings

In another embodiment of the present teachings, fibers according to the present teachings may be incorporated into a cage of a rolling element bearing. The cage is a source of friction for the rolling elements disposed in the bearing and thus a reduction in friction would be advantageous in such bearing applications.

In some known bearings, the cage bars or struts (the portions that separate or space the rolling elements) contain a grease reservoir (if the bearing is grease lubricated) that supplies the bearing with oil. Therefore, in this aspect of the present teachings, a grease-like porous fiber network or a structurally more rigid network (with longer interconnected fibers) is preferably located in or on the cage, e.g., in one or more grease reservoirs. Preferably, this porous network is located on a surface of the cage bar(s) adjacent to the rolling element(s) (e.g., roller bodies, such as ball bearings or cylindrical/tapered rollers) so as to be close enough to the rolling elements that need to be lubricated.

The fibrous network can be physically or chemically attached/adhered to the surface of the cage (e.g., the bars or struts) using adhesion chemistry technology known in the art. In the alternative, fibers according to the present teachings can be rubbed or otherwise deposited onto the surface of the cage or struts prior to assembling the bearing. The cage can be made from metals (sheet metal, steel, brass, for example) or from hard polymers. In case the cage is made of a polymer material, it is also possible to incorporate or embed the fibers into the surface of the cage when manufacturing (e.g., injection molding) the cage.

Friction can be reduced by disposing the fibrous network on the side of the cage bar(s) that is (are) in contact with the rolling elements (i.e. against which the cage bar(s) slide(s)). The temperature stability of the fibrous network can be tuned/adapted/adjusted by appropriately selecting the polymeric materials forming the fibers, as was described above.

One of the main reasons for reduced service life when grease is used with a steel cage is the fact that the cage scrapes on (frictionally contacts) the roller elements (bodies) during operation. Of course, a polymer material cage will also frictionally contact the rolling elements during operation, but the polymer cage redistributes the thin layer of oil that is adhered to the rolling elements rather than scrapes it off.

Therefore, in another aspect of the present teachings, a soft, fabric-like material made of the present fibers (as was described in more detail above) can be attached the cage (e.g., the cage bars). In this case, the fabric material (fibrous network) will gently wipe the adjacent rolling element(s) during the operation, thereby redistributing the lubricant layers and causing locally thin layers to be "repaired" and/or replenished. This property will enhance the grease life and bearing life.

For example, one or more lubricant (oil) reservoirs may be provided or defined in the bearing cage. A PA fiber mat may be disposed in the lubricant reservoir(s) or cavities and then overmolded. The PA fiber preferably acts like a sponge for retaining and releasing the lubricating fluid or oil.

This aspect of the present teachings preferably utilizes the phenomenon of super-cooling in an advantageous manner. For example, the melting point of the polymer is preferably higher than its crystallisation temperature. In this case, it may be possible to overmold the fiber mat without melting all of the fiber mat. The highest melting points occur in fibers.

The molding process parameters may be optimized, e.g., to provide good compatibility with seal materials and/or cages. This property could be used to increase the bearing speed rating by providing a "sticky" thickener on the "splash surface". Improved lubrication of land-riding cage surfaces also may be provided.

An oleophilic CoPA (PA co-polymer) optionally may be added to improve the PA cage surface affinity with oleophilic thickeners, as will be further described below.

Other Bearing Types Utilizing Fibers According to the Present Teachings

Using the same principle, a fiber structure may be disposed on plane-bearing liners or on washers to improve tribological functionality. By having fibers anchored in the polymer matrix, a high compression strength matrix can be combined with a low friction surface.

Water Absorption Functionality

Melt-spinnable fibers can have very different chemical properties. For example, their behavior can also be tuned to be very hydrophilic and in this case, the fibers will exhibit a very high affinity to water. Such hygroscopic fibers are capable of advantageously eliminating (absorbing) any free water in the lubrication system as well as any dissolved water. If placed in or on a seal, they can act as an active water removal device for industrial lubricants.

One particularly advantageous example of such a system is a sealed bearing wherein the seal is able to adsorb water, which would otherwise be very harmful to the bearing system. Water can result in corrosion and/or hydrolysis of the lubricant, for example, leading to early failures.

Thus, in certain aspects of the present teachings, hydrophilic and/or hygroscopic fibers may be disposed on the surface of a seal in addition or in the alternative to the above-described oleophilic fibers.

Fibers Applied to a Bearing Surface Utilizing a Melt-Spinning Process

A melt-spinning process can be used to directly apply fibers according to the present teachings onto the surface of a metallic conductor (e.g., a gear, bearing raceway, axial screws, etc), thereby leading to in situ deposition and a very cost-effective way of using the fibers as an in-service lubricant. The fibers may be sprayed directly onto the bearing/seal or cage surfaces in the production line and then allowed to cool. This manufacturing step could be performed in various ways, e.g., by controlling both the speed of spraying and rotating the target surfaces. This process will result in a fiber coating on the bearing surface that will adsorb oil. In one embodiment, the fibers are produced using melt-blowing techniques that directly apply the fibers onto the target object. In an alternative embodiment, electro-spinning processes can be utilized for very accurate fiber production and deposition control onto the metallic objects.

In one embodiment thereof, the fibers may function as a preservative (corrosion-preventing substance) for the bearing. The fibers (e.g., applied according the above-described spray-on method) may be used to form, together with an oil, a preservative, i.e. a grease-like layer to prevent corrosion of the metallic bearing or a similar object. This sprayed-on fiber layer can also facilitate beneficial running-in, when appropriate additives are present.

The same applies for conductive seals and cages according to the preceding embodiments.

If the seal or cage polymers are not conductive, another option is to use the super cooling effect so that overmolding is possible.

Application of such a fiber sponge (network) could also be utilized in transport systems (conveyor belt, for example) to improve production processes that suffer in many cases from poor lubrication and thus result in wear contamination of the objects that are being transported. It is also possible to make use of the oleophilic properties of the fiber material to lubricate and hold the oil, which would stop or prevent unwanted excessive oil leakage or contamination onto the products being transported.

Tunable Co-Polymer Fibers

As was mentioned above, an oleophilic CoPA (PA co-polymer) may be incorporated in order to improve the PA cage surface affinity with oleophilic thickeners. For example, block copolymers may be used as the thickener fiber material, which will improve structural integrity.

Polyamide hydrocarbon technology is particularly advantageous, because it allows one to make more hydrophobic polyamide-based resins that have different compatibility with oil and water than polyamide itself. This technology may be particular advantageous if ester oils or other polar oils are used.

In addition or in the alternative, in order to improve grease retention, amide tackifiers may be used to connect amorphous fibers as additives in PA cages.

A variety of modifications may be utilized in order to tune or adapt the oleophilicity and oil compatibility. For example, polymer molecules may be synthesized based on two types of chemical groups, e.g., wherein one is more oleophilic (or non-polar) and the other is more hydrophilic (polar). This can be implemented in a number of ways, such as, e.g., changing the chain length of the hydrocarbon in order to alter the hydrophobic properties of the polymer. If fibers are made from these polymers, the oleophilic nature may be tuned in accordance with the length of the hydrocarbon (HC) chains. Thus, this aspect of the present teachings not only enables the oil compatibility of the cages to be tuned, but also the fibers.

Thus, whereas polyamides used for the cage material are a largely crystalline material, polyamides incorporating fatty acids will be largely amorphous in structure. In this case, tackifiers may be used to connect amorphous fibers.

The rheological properties of hot-melt polyamides may also be used in this aspect of the present teachings.

The grease proposed in this aspect of the present teachings, e.g., using polyamides fibers, is preferably able to:

create a large degree of freedom in the hydrophilicitiy/hydrophobicitiy balance in the thickener, tune the rheological properties of the thickener to match desired grease properties, tune temperature-dependent behavior to match grease requirements for applications, or create temperature-triggers, and incorporate functional side groups for cross-linking, in order to immobilize the network structure in the thickener.

In the adhesion properties of the fibers, their 'tackiness' becomes an important property. Therefore, methods for tuning that property are significant in this aspect of the present teachings. One important characteristic of lubricating grease, as compared to oil, is that it 'stays in place'. Thus, the grease needs to be "thick" and must "stick" in order to be effective. The ability to stay in place is not just a matter of grease viscosity but also a matter of the ability to stick (adhere) to other surfaces. This phenomena is called tackiness and can be explained as a substance's ability to be cohesive (stick to itself) and adhesive (stick to other surfaces).

The polymers forming the thickener of the grease can be used as "tackifiers". Traditional tackifiers are polymers of high molecular weight, typically in the range from 400,000 to 4,000,000. As one unique property of the fiber-thickened grease according to this aspect of the present teachings, using polymers molecules as the thickener material and coating the polymers to provide adhesion makes it possible to tune both cohesion and adhesion while controlling bleeding (oil loss).

Self-Generating and Self-Assembling Grease

Another aspect of the present teachings concerns embodiments, which enable oil to be pumped or moved within the lubrication system, but wherein the moving parts are lubricated with greases, such as in a gearbox.

In one embodiment of this aspect of the present teachings, polymer fiber thickeners and oils may be sprayed inside bearings separately in order to form a self-generating grease inside the bearing. For this purpose, polymer fibers may be processed, e.g., into granules or particles. Oils may then be subsequently sprayed into the bearing separately, e.g., as a fine oil mist. The oil and polymer fiber particles will then (re)combine in situ to form a grease.

In another embodiment, the fibers may be produced, e.g., by melt-blowing or electro-spinning, and then deposited onto the surface of gears, gearboxes, bearings, etc. The oil is added separately or just before application to the mechanical system.

One advantage of this embodiment is that pumping of oil is easier (less energy intensive) than pumping of thick grease, because oil is less viscous. Thus, energy consumption may be reduced without sacrificing lubricating performance.

Another advantages of this embodiment is that the distribution of grease inside the bearing, e.g., on the cage, or in the rolling contact, can be fully controlled.

Another advantage is the complete freedom and variability of grease formulation depending on re-lubrication needs and operating conditions.

Another advantage is that the bearing may be lubricated with oil to ensure replenishment of the rolling contact, wherein excess oil is adsorbed in the shape and form of grease.

Advanced Lubrication Systems Using Self-Generating and Self-Assembling Grease

Known automatic lubrication systems are currently used for intermittent lubrication and re-lubrication of bearing applications. In comparison with oil lubrication, grease lubrication is limited by high viscosity grease flow and the risk of blocked lines or conduits.

In addition, grease lubrication properties and grease stability may be affected when pumping greases through lines or pipes that are typically narrow, thereby potentially reducing lubrication performance.

Moreover, pumping of grease requires high pressures and large pumps, owing to the 'thick' or viscous nature of grease. Of course, larger pumps operating at higher pressures require more energy as well as more space.

Thus, this aspect of the present teachings overcomes the disadvantages of known grease pumping systems, because oil may be pumped to the to-be-lubricated surface, instead of grease.

Further, in this aspect of the present teachings, polymer fibers for grease thickening may be combined with base oil in a new type of pumping system. In this system, base oil is pumped through a pumping line towards the intended point for re-lubrication, where it is combined with a separate addition of fibers according to the present teachings, e.g., polymer fibers. These fibers may be sprayed, pumped, or be already present on the contact surface. Polymer fibers may consist of, e.g., solid powder particles.

Consequently, the base oil and polymer thickener fibers may be pumped towards the re-lubrication point without any limitation on pumping, pumping speed or line blockage. Additionally, through direct mixing, there is no effect on grease stability, aging or lubrication performance.

In addition, the grease can be formulated so that a re-lubrication formulation is possible in-line. That is, when grease for re-lubrication is formulated "in-line", its composition and properties may be varied to match varying application (usage) conditions. As a non-limiting example, re-lubrication of main shaft bearings in wind turbines is typically performed under varying conditions, including the ambient conditions (cold weather, summer weather), the running-in phase, storm conditions/vibrating conditions, etc. For cold weather, grease having a lower consistency or viscosity typically is more advantageous than greases having a high consistency or viscosity. During a hot summer, the opposite is true. By varying the grease formulation depending on summer or winter conditions, lubrication may be optimized. Variation of grease formulations may be integrated into the re-lubrication control system. It is possible to mix complex fluids such as greases from a base.

Bearing Specific Applications

In U.S. Pat. No. 7,275,319, the effect of making dimples on rolling bearing surfaces was described. Dimples improve the build-up of a lubricant film in the case of starved (i.e. insufficient grease) lubrication. The dimples are assumed to carry lubricant to the contacts and release the lubricant in the inlet of the contact, thereby making the contacts less starved and resulting in an increase of the lubricating film. The dimples are preferably refilled prior to starting the next contact cycle. The '319 patent discloses the option of coating the surfaces with an oleophilic film that would facilitate the replenishment of the dimples.

According to the present teachings, a corresponding coating can be provided by the fiber thickened grease in which oleophilic fibers according to the present teachings are utilized. The fibers may be sheared off on the lands between the dimples where the "severity" of the contact is very strong. In the dimples themselves, the contacts stresses are lower and no metal-to-metal contact will occur. This means that such material will not be easily removed from this spot and therefore, such material is an optimal lubricant for these bearing applications.

The same idea can also be used for bearing surfaces with a clear lay, such as hard-turned or cross-honed surfaces. The contact intensity will be high on the top of the roughness grooves and, in the case of mixed lubrication, metal-to-metal contact will occur here. The oleophilic grease material will stay in the lower part of the surface topography but will promote replenishment of the top of the grooves by driving a lubricant flow.

Friction Reduction at Metal Contacts

In another embodiment of the present teachings, a nano-fibrous fabric-like material made with fibers according to the present teachings may be used as an anti-fretting solution. The porous and thin layer will retain oil and the added local lubrication will reduce fretting. Electrostatic fiber spinning may be utilized to deposit the fibers on the bearings, e.g., on the outer ring of the bearing, to prevent fretting.

By electro-spraying the various polymers, including wax types, the fiber structured material (directly spun onto the surface) opens the possibility of preserving (preventing corrosion of) large bearings, avoiding oil leakage and decreasing the corrosion risk caused by a protective film that is too thin.

In addition, the present teachings may be advantageously combined with the above-noted teachings from '319 patent concerning dimples, and thus the contents of the '319 patent, in particular the description of the dimples, are fully incorporated herein by reference.

In addition, the creation of a dampening surface between metallic components will reduce vibration and noise levels. Wear will be reduced by smoothing the surface (by replenishment) and this will reduce the amount of metallic debris in the contact zone and therefore further reduce wear and noise. Shafts, bearing rings and other components are suitable for this protection mechanism.

Figure 4:
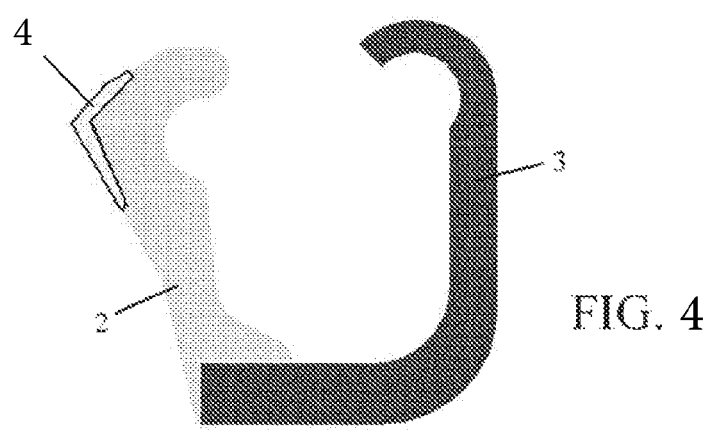
FIG. 4 shows a seal according to the present teachings having a fibrous network in the form of a non-woven fabric disposed on the seal lip portion.

In another aspect of the present teachings, a type of wick may be disposed so as to make sliding contact between the inner and outer ring, e.g., like a seal made of a fibrous network or fabric. In this embodiment, the wick can transport oil from the inner ring to the outer ring or the oil from regions of high oil content to regions of low oil content. This cloth can also be adhered to the seal itself. FIG. 4 shows a schematic example of a representative dual material seal lip comprising a fibrous network in the form of a non-woven fabric 4 that is capable of absorbing/releasing oil and a bulk seal material 2 that supports the non-woven fabric 4. The bulk seal material 2 is attached to a steel support 3 for further support.

Fibers Deposited on a Surface

In any of the above-mentioned embodiments, in which fibers are deposited onto (e.g., rubbed onto, adhered to, embedded or incorporated in, etc.) a surface in need of lubrication in order to, e.g., form a self-generating thickened lubricant upon contact with a lubricating fluid or other oil, or to provide lubricating functionality themselves (e.g., as 'dry' lubricants), the thickness of the fibers may be between one monolayer of fibers (or fabric material) to tens of layers up to hundreds of layers. Particularly preferred ranges are between 1-50 layers, more preferably 2-20 layers.

EXPERIMENTAL EXAMPLES

The following representative examples demonstrate the ability to form fiber-thickened oils with grease-like properties according to the present teachings. In all examples, cone penetration was determined in accordance with the standard ASTM D217-10 (worked penetration after 60 strokes at 25° C.) Usual consistencies of NLGI classes 0-3 were obtained in all examples.

In the following Examples 1-6, the fibers were initially provided in the form of a cloth on a roll, which was subsequently broken by both a homogenizer and the strain applied by a 3-roll mill. The 3-roll mill is a device that is sometimes used in the art to add additives to grease compositions or to perform other mechanical 'working' and homogenization on the grease.

Example 1

Polypropylene (PP) fibers having an average fiber diameter of about 400 nm were mixed with polyalphaolefin (PAO) having a base oil viscosity of 48 cSt at 40° C. The fiber density was 5.6%. The cone penetration was 37.3 mm and the NLGI grade or consistency was 0.

Example 2

Polypropylene (PP) fibers having an average fiber diameter of about 400 nm were mixed with polyalphaolefin (PAO) having a base oil viscosity of 48 cSt at 40° C. The fiber density was 5.9%. The cone penetration was 365 mm and the NLGI grade or consistency was 0.

Example 3

Polypropylene (PP) fibers having an average fiber diameter of about 400 nm were mixed with polyalphaolefin (PAO) having a base oil viscosity of 48 cSt at 40° C. The fiber density was 6.6%. The cone penetration was 347 mm and the NLGI grade or consistency was 0/1.

Example 4

Polypropylene (PP) fibers having an average fiber diameter of about 400 nm were mixed with polyalphaolefin (PAO) having a base oil viscosity of 48 cSt at 40° C. The fiber density was 7.3%. The cone penetration was 324 mm and the NLGI grade or consistency was 1.

Example 5

Polypropylene (PP) fibers having an average fiber diameter of about 400 nm were mixed with polyalphaolefin (PAO) having a base oil viscosity of 48 cSt at 40° C. The fiber density was 7.9%. The cone penetration was 313 mm and the NLGI grade or consistency was 1.

Example 6

Polypropylene (PP) fibers having an average fiber diameter of about 400 nm were mixed with polyalphaolefin (PAO) having a base oil viscosity of 48 cSt at 40° C. The fiber density was 10%. The cone penetration was 230 mm and the NLGI grade or consistency was 3.

Figure 3:
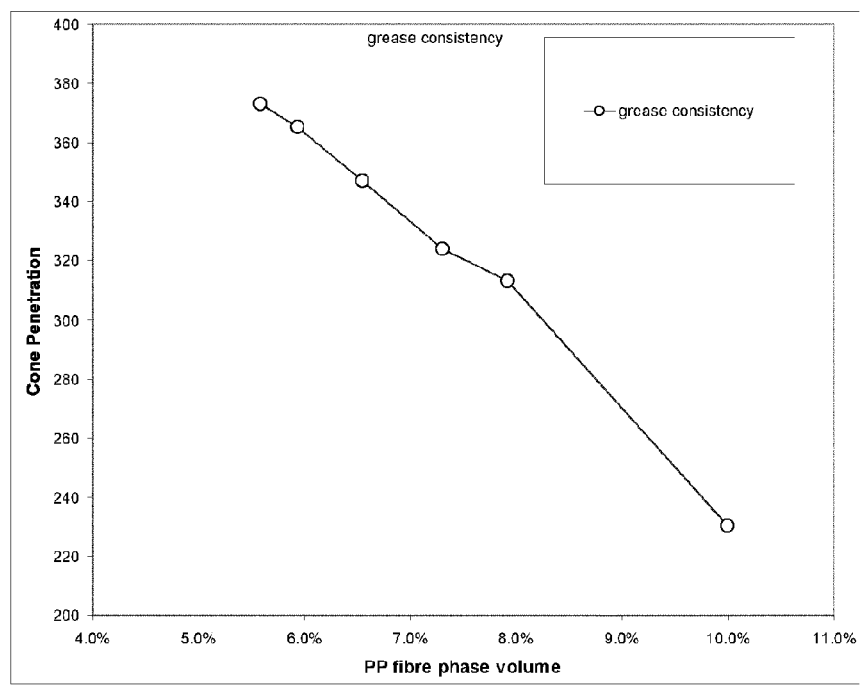
FIG. 3 is a graph showing the changes in grease consistency relative to fiber density according to experimental examples of the present teachings.

FIG. 3 graphically shows the change in grease consistency with increasing fiber density.

Additional embodiments of the present teachings disclosed herein include, but are not limited to:

1. A grease comprising an oil and/or lubricating fluid and thickening fibers having a length in the micron range and a diameter or width in the micron or nanometer range, the fibers being oleophilic.
2. A grease according to embodiment 1, wherein the fibers comprise at least two portions having different physical and/or chemical properties.
3. A grease according to embodiment 2, wherein at least one of the portions has a higher affinity to a like portion than to the oil and/or lubricating fluid, thereby imparting a self-assembly property to the thickening fibers.
4. A grease according to any preceding embodiment, wherein the fibers have a length of 100-500 microns.
5. A grease according to embodiment 4, further comprising oleophilic thickening fibers having a length of 1-100 microns.
6. A grease according to any one of embodiments 1-3, wherein the fibers have a length of 1-100 microns.
7. A grease according to any preceding embodiment, wherein the fibers have a length that is at least about 5-10 times the diameter thereof.
8. A grease according to any preceding embodiment, wherein the thickening fibers are a mixture of organic fibers, e.g., polypropylene, and inorganic, e.g., ceramics, e.g., aluminum oxide and/or silicon dioxide.
9. A grease according to any preceding embodiment, wherein the fibers also have oleophobic and/or hydrophilic properties.
10. A grease according to any preceding embodiment, further comprising non-oleophilic fibers having oleophobic and/or hydrophilic and/or hygroscopic properties.
11. A grease according to any preceding embodiment, wherein the fibers are biodegradable.
12. A grease according to any preceding embodiment, wherein the thickening fibers comprise cellulose and/or gum.
13. A grease according to any preceding embodiment, wherein the thickening fibers are coated, e.g., randomly coated, with a composition that is more polar than the thickening fiber.
14. A grease according to any preceding embodiment, wherein the thickening fibers comprise Janus fibers.
15. A grease according to any preceding embodiment, wherein the thickening fibers are comprised of a mixture of at least one polar polymer, e.g., polyethylene oxide (PEO), and at least one non-polar polymer, such as polystyrene (PS) or polypropylene (PP).
16. A grease according to embodiment 15, wherein the fiber is a block co-polymer.
17. A grease according to any preceding embodiment, wherein the fibers have a strong affinity for steel and/or polymer surfaces.
18. A grease according to any preceding embodiment, wherein the fibers form a sponge-like network that absorbs or retains the lubricating fluid or oil.
19. A grease according to embodiment 18, wherein the sponge-like network has the property that it shrinks or contracts as the temperature increases, thereby squeezing out lubricating fluid or oil.
20. A grease according to any preceding embodiment, wherein the grease comprises at least two types of thickening fibers, each having a different melting temperature.

21. A grease according to embodiment 20, wherein at least the thickening fiber having the lowest melting temperature acts as a lubricant when the grease is brought to a temperature above the melting temperature of said thickening fiber.
22. A grease according to any preceding embodiment, wherein the thickening fibers are formed from a wax and/or further comprising wax.
23. A grease according to any preceding embodiment, further comprising a low molecular weight polymer, e.g., a wax, that cross-links thickening fibers having a higher molecular weight.
24. A grease according to embodiment 22 or 23, wherein the wax is a natural wax or a hydrocarbon wax.
25. A grease according to embodiment 24, wherein the wax is bees wax or paraffin wax.
26. A grease according to any preceding embodiment, wherein the thickening fiber is a tackifier or further comprising a tackifier.
27. A grease according to any preceding embodiment, wherein the thickening fibers and the lubricating fluid or oil are selected such that the thickening fibers are capable of self-generating a fibrous sponge-like network when the thickening fibers contact the lubricating fluid or oil.
28. A fiber according to any preceding embodiment (i.e. without the oil or lubricating fluid), preferably constituting between about 0.1 and 100 wt % of a final material, more preferably about 50-100 wt %.
29. A bearing surface coated with a fiber according to embodiment 28 or having a fiber according to embodiment 28 embedded or incorporated into the bearing surface, the bearing surface preferably comprising steel.
30. A seal coated with a fiber according to embodiment 28 or having a fiber according to embodiment 28 embedded or incorporated into the surface of the seal, the seal optionally comprising an elastomeric material, e.g., NBR or polyurethane and/or wax fibers disposed in the seal.
31. A bearing cage coated with a fiber according to embodiment 28 or having a fiber according to embodiment 28 embedded or incorporated into the surface of the cage, the cage preferably comprising steel or polyamide.
32. A bearing surface or seal or bearing cage according to embodiments 29-31, respectively, having a plurality of oil reservoirs defined in the bearing surface or seal surface or cage surface, respectively, the fibers and oil reservoirs being located at least a primary point of contact between two parts moving relative to each other during operation.
33. A bearing surface or seal or bearing cage according to embodiments 29-31, respectively, having a porous surface structure and/or a surface structure that has been chemically treated to cause lubricating fluid or oil to be released from the grease under prescribed operating conditions.
34. A grease, fiber, seal or bearing cage according to any preceding embodiment, wherein the oleophilic thickening fibers have a diameter between about 50 nm and 10 microns, and more preferably between about 100 nm and 1 micron.
35. A grease, fiber, seal or bearing cage according to any preceding embodiment, wherein the oil and/or lubricating fluid comprises one or more of mineral oil obtained from crude oil, group I, II and III lubricants, group IV lubricants (polyalphaolefins "PAO") and group V lubricants (all others).
36. A grease, fiber, seal or bearing cage according to any preceding embodiment, wherein the oil and/or lubricating fluid comprises one or more of mineral oil, synthetic ester, and plant-based oil and their derivatives, such as oils derived from rapeseed, canola, sunflower, canola and palm.
37. A grease, fiber, seal or bearing cage according to any preceding embodiment, wherein the oil and/or lubricating fluid comprises one or more of animal-based oils, their derivatives and synthetic lubricants such as polyglycols (PG), polyalkylene glycol (PAG), white oils, silicone oils, very-high viscosity index oils (VHVI), water, glycerol and waxes.
38. A grease, fiber, seal or bearing cage according to any preceding embodiment, wherein the oil and/or lubricating fluid has a viscosity that is between about 1-1000 cSt at 40° C.
39. A grease, fiber, seal or bearing cage according to any preceding embodiment, wherein the fibers comprise a polymeric material that has been spun into fibers.
40. A grease, fiber, seal or bearing cage according to any preceding embodiment, wherein the fibers comprise one or more of polyamide (PA), nylon 6,6, polyamide-6,6 (PA-6,6), polyamide-4,6 (PA-4,6), polyurethanes (PU), polybenzimidazole (PBI), polycarbonate (PC), polyacrylinitrile (PAN), acrylonitrile rubber (NBR), polyvinylalcohol (PVA), polylactic acid (PLA), polyethylene-co-vinyl-acetate (PEVA), PEVA, polymethacryate (PMMA), tetrahydroperfluorooctylacrylate (TAN), polyethylene oxide (PEO), collagen-PEO, polyaniline (PANI), polystyrene (PS), silk-like polymer with fibronectin functionality, polyninylcarbazole, polyethylene rerephtalate (PET), polyacrylic acid (PAA), polypyrene methanol (PM), polyvinylphenol (PVP), polyvinylchloride (PVC), cellulose acetate (CA), polyacrylamide (PAAm), PLGA, collagen, polycaprolactone (PCL), poly(2-hydroxyethyl methacrylate) (HEMA), poly(vinylidene fluoride) (PVDF), polyether imide (PEI), polyethylene glycol (PEG), poly(ferrocenyldimethylsilane) (PFDMS), poly(ethylene-co-vinyl alcohol), polyvinyl pyrrolidone (PVP), polymetha-phenylene isophthalamide, polypropylene (PP), polyethylene naphthalate (PEN), Teflon®, polytetrafluorethene (PTFE), waxes, waxy polymers, polyolefins, polyesters, and polysulfones.
41. A grease, fiber, seal or bearing cage according to any preceding embodiment, wherein the fiber comprises one or more polymers derived from a natural or biodegradable source, such as, e.g., polysaccharides, such as cellulose, starch, chitin, chitosan, proteins, (poly)peptides and gelatin.

The preferred embodiments and exemplary examples were described above in combinations of features and steps that may not be necessary to practice the invention in the broadest sense, and such detailed combinations have been described merely for the purpose of particularly describing representative examples of the invention. Furthermore, various features of the above-described representative examples, as well as the various independent and dependent claims, may be combined in ways that are not specifically and explicitly enumerated in order to provide additional useful embodiments of the present teachings.

All features, oils, base lubricating fluids, materials, polymers, fibers, additives, etc. disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. An apparatus comprising:
   a surface in need of lubrication,
   a fibrous network in the form of a non-woven fabric affixed to the surface, the non-woven fabric being comprised of oleophilic fibers having a diameter between 100 nm and 1 micron, and a length that is at least 5 times the diameter, and
   oil or lubricating fluid impregnated in the fibrous network.

2. The apparatus according to claim 1, wherein the fibrous network is in the form of a non-woven cloth, pad, or mat.

3. The apparatus according to claim 1, wherein the surface is a surface of a seal, which is comprised of an elastomeric material.

4. The apparatus according to claim 3, wherein the oleophilic fibers comprise a polymeric material that has been spun into fibers.

5. The apparatus according to claim 4, wherein the polymeric material is comprised at least substantially of polypropylene (PP) or polyamide (PA).

6. The apparatus according to claim 5, wherein the fibrous network further comprises a cross-linking polymer that cross-links the oleophilic fibers, which have a higher molecular weight than the cross-linking polymer.

7. The apparatus according to claim 6, wherein the cross-linking polymer polymer is a natural wax or a hydrocarbon wax.

8. The apparatus according to claim 1, wherein the surface is a surface of a bearing cage, which is comprised of steel or polyamide.

9. The apparatus according to claim 8, wherein the oleophilic fibers comprise a polymeric material that has been spun into fibers.

10. The apparatus according to claim 9, wherein the polymeric material is comprised at least substantially of polypropylene (PP) or polyamide (PA).

11. The apparatus according to claim 10, wherein the fibrous network further comprises a cross-linking polymer that cross-links the oleophilic fibers, which have a higher molecular weight than the cross-linking polymer.

12. The apparatus according to claim 11, wherein the cross-linking polymer polymer is a natural wax or a hydrocarbon wax.

13. The apparatus according to claim 1, wherein at least one of the oil and the lubricating fluid comprises at least one of:
   mineral oil obtained from crude oil,
   group I, II and III lubricants, group IV lubricants, and
   group V lubricants.

14. The apparatus according to claim 1, wherein at least one of the oil and the lubricating fluid comprises at least one of mineral oil, synthetic ester, and plant-based oil and their derivatives.

15. The apparatus according to claim 1, wherein at least one of the oil and the lubricating fluid comprises at least one of polyglycol (PG), polyalkylene glycol (PAG), white oil, silicone oil, very-high viscosity index oil (VHVI), glycerol and wax.

16. The apparatus according to claim 1, wherein at least one of the oil and the lubricating fluid has a viscosity that is between 10 and 300 cSt at 40° C.

17. The apparatus according to claim 1, wherein the oleophilic fibers comprise a polymeric material that has been spun into fibers.

18. The apparatus according to claim 17, wherein the polymeric material is comprised at least substantially of at least one of polypropylene (PP) and polyamide (PA).

19. The apparatus according to claim 1, wherein the oleophilic fibers comprise at least one of polyamide (PA), nylon 6,6, polyamide-6,6 (PA-6,6), polyamide-4,6 (PA-4,6), polyurethane (PU), polybenzimidazole (PBI), polycarbonate (PC), polyacrylonitrile (PAN), acrylonitrile rubber (NBR), polyvinylalcohol (PVA), polylactic acid (PLA), polyethylene-co-vinyl-acetate (PEVA), polymethacryate (PMMA), tetrahydroperfluorooctylacrylate (TAN), polyethylene oxide (PEO), collagen-PEO, polyaniline (PANI), polystyrene (PS), silk-like polymer with fibronectin functionality, polyvinylcarbazole, polyethylene terephtalate (PET), polyacrylic acid (PAA), polypyrene methanol (PM), polyvinylphenol (PVP), polyvinylchloride (PVC), polyacrylamide (PAAm), PLGA, polycaprolactone (PCL), poly(2-hydroxyethyl methacrylate) (HEMA), poly(vinylidene fluoride) (PVDF), polyether imide (PEI), polyethylene glycol (PEG), poly(ferrocenyldimethylsilane) (PFDMS), poly(ethylene-co-vinyl alcohol), polyvinyl pyrrolidone (PVP), polymetha-phenylene isophthalamide, polypropylene (PP), polyethylene naphthalate (PEN), polytetrafluorethene (PTFE), waxes, waxy polymers, polyolefins, polyesters, and polysulfones.

20. The apparatus according to claim 1, wherein the oleophilic fibers comprise at least two portions having different physical and/or chemical properties.

21. The apparatus according to claim 1, wherein the oleophilic fibers are comprised of a mixture of at least one polar polymer, and at least one non-polar polymer.

22. The apparatus according to claim 21, wherein the oleophilic fibers are made from a block co-polymer.

23. The apparatus according to claim 1, wherein the non-woven fabric has the property that it shrinks as the temperature increases, thereby squeezing out lubricating fluid or oil.

24. The apparatus according to claim 1, further comprising another oleophilic fiber having a different melting temperature that is incorporated into the fibrous network.

25. The apparatus according to claim 24, wherein at least the oleophilic fiber having the lowest melting temperature acts as a lubricant when the fibrous network is brought to a temperature above the melting temperature of the oleophilic fiber.

26. The apparatus according to claim 1, wherein the fibrous network further comprises wax.

27. The apparatus according to claim 26, wherein the wax is a natural wax or a hydrocarbon wax.

28. The apparatus according to claim 27, wherein the wax is bees wax or paraffin wax.

29. The apparatus according to claim 1, wherein the fibrous network further comprises a cross-linking polymer that cross-links the oleophilic fibers, which have a higher molecular weight than the cross-linking polymer.

30. The apparatus according to claim 1, wherein:
   the oil is polyalphaolefin, and
   the oleophilic fibers are comprised of polypropylene (PP) fibers having an average fiber diameter of 350-450 nm.

31. The apparatus according to claim 1, wherein the non-woven fabric has a fiber thickness of between 2-200 layers of fibers.

32. The apparatus according to claim 1, wherein the non-woven fabric has a fiber thickness of between 10-100 layers of fibers.

33. The apparatus according to claim 1, wherein the non-woven fabric has a fiber thickness of between 10-50 layers of fibers.

34. The apparatus according to claim 1, wherein the oleophilic fibers are comprised of a mixture of polyethylene oxide (PEO), and at least one of polystyrene (PS) and polypropylene (PP).

* * * * *